(12) United States Patent
Regismond et al.

(10) Patent No.: US 12,433,312 B2
(45) Date of Patent: *Oct. 7, 2025

(54) COMPOSITION IN THE FORM OF AN OIL-IN-WATER EMULSION COMPRISING GROUND WHITE OR YELLOW MUSTARD SEED

(71) Applicant: Conopco, Inc., Englewood Cliffs, NJ (US)

(72) Inventors: Sudarshi Tanuja A Regismond, Umhlanga Rocks (ZA); Aleksander Arie Reszka, Ridderkerk (NL)

(73) Assignee: Conopco, Inc., Englewood Cliffs, NJ (US)

( * ) Notice: Subject to any disclaimer, the term of this patent is extended or adjusted under 35 U.S.C. 154(b) by 1161 days.

This patent is subject to a terminal disclaimer.

(21) Appl. No.: 15/307,213

(22) PCT Filed: Apr. 9, 2015

(86) PCT No.: PCT/EP2015/057669
§ 371 (c)(1),
(2) Date: Oct. 27, 2016

(87) PCT Pub. No.: WO2015/169527
PCT Pub. Date: Nov. 12, 2015

(65) Prior Publication Data
US 2017/0042207 A1     Feb. 16, 2017

(30) Foreign Application Priority Data
May 6, 2014    (EP) .................................. 14167220

(51) Int. Cl.
*A23L 27/60*    (2016.01)
*A23L 33/20*    (2016.01)

(52) U.S. Cl.
CPC ............... *A23L 27/60* (2016.08); *A23L 33/20* (2016.08); *A23V 2002/00* (2013.01)

(58) Field of Classification Search
CPC ....... A23L 27/60; A23L 2002/00; A23L 33/20
See application file for complete search history.

(56) References Cited

U.S. PATENT DOCUMENTS

| 4,034,124 A | 7/1977 | van Dam |
| 4,062,979 A | 12/1977 | Haak |

(Continued)

FOREIGN PATENT DOCUMENTS

| AU | 2015258019 | 10/2016 |
| AU | 2015258088 | 10/2016 |

(Continued)

OTHER PUBLICATIONS

"Mustard—New World Encyclopedia". Available online at www.newworldencyclopedia.org/entry/Mustard on Aug. 20, 2008. (Year: 2008).*

(Continued)

*Primary Examiner* — Erik Kashnikow
*Assistant Examiner* — Assaf Zilbering
(74) *Attorney, Agent, or Firm* — Ipsilon USA—NLO

(57) ABSTRACT

The present invention relates to a composition in the form of an oil-in-water emulsion, preferably a mayonnaise-type emulsion, containing ground white or yellow mustard seed and enzyme modified egg yolk. This way the amount of oil in the emulsion can be reduced, while keeping the structure of full-fat mayo, without using large amounts of thickeners or water-structurants. Moreover the invention relates to the use of ground white or yellow mustard seed as an ingredient of the emulsion to reduce the concentration of oil in the emulsion.

19 Claims, 1 Drawing Sheet

3.7cm 3.7cm 76 holes (~3mm²)

(56) References Cited

U.S. PATENT DOCUMENTS

| | | | |
|---|---|---|---|
| 4,119,564 A | 10/1978 | Van Dam | |
| 4,498,598 A | 2/1985 | Bae | |
| 4,923,707 A | 5/1990 | Schoenberg | |
| 4,980,186 A | 12/1990 | Sharafabadi | |
| 5,028,447 A | 7/1991 | Schenk | |
| 5,976,587 A * | 11/1999 | Yamauchi | A23L 27/60 426/112 |
| H2095 H | 1/2004 | Young | |
| 2003/0044507 A1 * | 3/2003 | Tobita | A23L 27/60 426/605 |
| 2008/0193615 A1 | 8/2008 | Cirigliano et al. | |
| 2014/0272075 A1 | 9/2014 | Sass et al. | |
| 2017/0042207 A1 | 2/2017 | Regismond et al. | |
| 2017/0049140 A1 | 2/2017 | Regismond et al. | |

FOREIGN PATENT DOCUMENTS

| | | | |
|---|---|---|---|
| CA | 2508513 | 12/2007 | |
| CH | 692895 A5 * | 12/2002 | A23L 27/18 |
| EP | 0319064 | 6/1989 | |
| EP | 0663153 | 7/1995 | |
| EP | 0792587 | 9/1997 | |
| EP | 0986309 | 3/2000 | |
| EP | 0633940 | 12/2002 | |
| EP | 2552467 | 2/2013 | |
| EP | 3151687 | 2/2018 | |
| FR | 2291707 | 6/1976 | |
| FR | 2349284 | 11/1977 | |
| GB | 1119430 A * | 7/1968 | A23L 27/18 |
| JP | 2002171931 | 6/2002 | |
| RU | 2409990 | 1/2011 | |
| WO | WO02069737 | 9/2002 | |
| WO | WO02089602 | 11/2002 | |
| WO | WO2004056187 | 7/2004 | |
| WO | WO2008098804 | 8/2008 | |
| WO | WO2011123281 | 10/2011 | |
| WO | WO2013092086 | 6/2013 | |
| WO | WO2014124032 | 8/2014 | |
| WO | WO2015169506 A1 | 11/2015 | |
| WO | WO2015169527 | 11/2015 | |

OTHER PUBLICATIONS

"Mustard—New World Encyclopedia", Available online at www.newworldencyclopedia.org/entry/Mustard. (Year: 2008).*

Dai et al., "Release of Allyl Isothiocyanate from Mustard Seed Meal Powder". from Journal of Food Science vol. 71, Nr. 1. (Year: 2014).*

NPL "Mustard Types" Available online at https://www.thenibble.com/reviews/main/condiments/mustard/mustard-glossary2.asp (Year: 2013).*

Google Translate translation of top left paragraph on p. 1 of Japanese Patent Application Laid-Open No. 48-36373. (Year: 2023).*

Pursuant to MPEP § 2001.6(b) applicants bring the following co-pending application to the Examiner's attention: Applicant: Regismond et al., Case No. F8223USw, U.S. Appl. No. 15/307,223, filed Oct. 27, 2016, for Composition in the Form of an Oil-In-Water Emulsion Comprising Ground White or Yellow Mustard.

IPRP in PCTEP2015056725, Jul. 29, 2016 (NPL 1, pp. 1-18).

IPRP2 in PCTEP2015057669, Jul. 29, 2016 (Npl 1, pp. 19-35).

Search Report & Written Opinion in EP14167215, Nov. 5, 2014 (NPL 1, pp. 36-45).

Search Report & Written Opinion in EP14167220, Nov. 6, 2014 (NPL 1, pp. 46-55).

Search Report & Written Opinion in PCTEP2015056725, Jun. 2, 2015 (NPL 1, pp. 56-70).

Search Report & Written Opinion in PCTEP2015057669, Jun. 5, 2015 (NPL 1, pp. 71-85).

Written Opinion 2 in PCTEP2015057669, Mar. 31, 2016 (NPL 1, pp. 86-95).

Thomas et al; Handbook of Herbs and Spices; Mustard; 2004; 196-205; 2.

Sehgal G et al; Journal of Food Science and Technology; Physical and functional properties of mucilages from yellow mustard (*Sinapis alba* L.) and different varieties of fenugreek (*Trigonella foenum-graecum* L.) seeds; 2002; 367-370—Abstract only; 39 (4).

Hemingway J.S.; *Brassica* oilseeds; The mustard species condiment and food ingredient use and potential as oilseed crops; 1995; 373-383—Abstract only.

Kirk J.T.O et al; Journal of the Australian Institute of Agricultural Science; Mustards as possible oil and protein crops for Australia; 1978; 143-156—Abstract only; 44, No. 3/4.

Goudappel et al.; Measurement of Oil Droplet Size Distributions in Food Oil/Water Emulsions by Time Domain Pulsed Field Gradient NMR; Journal of Colloid and Interface Science; 2001; 535-542; vol. 239.

Alderliesten, M.; "Mean Particle Diameters. Part II: Standardization of nomenclature"; Particle & Particle Systems Characterization; 1991; pp. 237-241; 8.

* cited by examiner

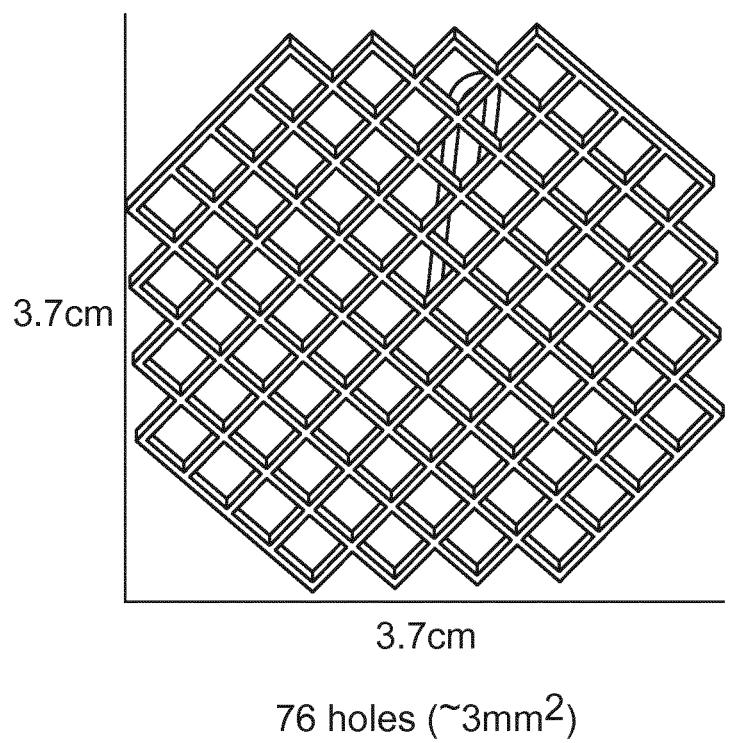
76 holes (~3mm²)

COMPOSITION IN THE FORM OF AN OIL-IN-WATER EMULSION COMPRISING GROUND WHITE OR YELLOW MUSTARD SEED

FIELD OF THE INVENTION

The present invention relates to a composition in the form of an oil-in-water emulsion, preferably a mayonnaise-type emulsion, containing ground white or yellow mustard seed and enzyme modified egg yolk. The invention further relates to a method for preparing the emulsion. Moreover the invention relates to the use of ground white or yellow mustard seed as an ingredient of the emulsion to reduce the concentration of oil in the emulsion.

BACKGROUND TO THE INVENTION

Mayonnaise is a food product that traditionally contains vegetable oil, egg yolk or whole egg, and vinegar. The amount of oil generally ranges from about 75% to 80% and is present as dispersed phase in the continuous aqueous phase. In some countries, especially France, mustard also is a common ingredient of mayonnaises. Mustard seeds are the prime source for mustard. Grinding the seeds and mixing with vinegar and water creates the condiment known as mustard. Various plant species provide mustard seeds: *Sinapis alba* and *Brassica hirta* (for white and yellow mustard), *Brassica juncea* (for brown Indian mustard or oriental mustard), and *Brassica nigra* (for black mustard).

Currently there is a tendency to decrease the oil level of mayonnaises, in order to decrease the caloric content (because of nutritional and health reasons). Lowering the amount of oil in an otherwise standard mayonnaise leads to a less dense packing of the oil droplets in the water phase resulting in reduced viscosity and/or thickness. Such decrease of the thickness of a mayonnaise can take place rapidly: upon reduction of the oil level with as little as 1% or 2%, the packing of the oil droplets becomes less dense. Such a product with reduced oil content generally will be pourable rather than spoonable. Product defects can also occur upon reduction of the oil content, e.g. emulsion instability and syneresis. Many 'light mayonnaises' are on the market, which contain less oil than the mayonnaise of the traditional recipes, and generally also contain a structurant for the water phase of the light mayo. The structurant thickens the continuous water phase, and keeps the emulsion stable during storage and use. Additionally the structurant helps to provide a product of which the thickness and viscosity are similar to the traditional mayonnaises. Common structurants are gelatinised native starches, chemically modified starches, other hydrocolloids like xanthan gum, guar gum, and carrageenan, and cellulosic fibres like the citrus fibres. The use of such structurants however can affect flavour and mouthfeel of the formulation. Starch in emulsions for example can lead to sticky and/or chewy products.

Additionally, reduction of oil in the recipes leads to reduction of the use of valuable resources like vegetable oil and oil crops, and consequently less pressure on the environment for the growing of the oil crops. Additionally, consumers more and more are in favour of products which come close to traditional recipes. Therefore modern food products should preferably be free from ingredients which are considered to be artificial or which traditionally were not present in such food products. Examples of this are additives like preservatives, colourants, flavours, structurants, and metal chelators like EDTA. Therefore ingredients which are traditionally present in food products, should also provide the functionality of such ingredients that are considered to be artificial. Also, by reducing the amount of ingredients which are considered to be artificial, valuable resources can be saved, leading to food products which are more sustainable with respect to the environment than traditionally known products. For example, without starch or gums, no crops need to be grown from which the starch or gum is extracted.

Many attempts have been made to develop mayonnaise-type emulsions, which conform to the requirements. Additionally many light mayonnaises are available on the market in which attempts have been made to produce a good quality product whose properties are close to full-fat mayonnaise.

WO 02/089602 A1 relates to an edible, reduced fat oil-in-water type emulsion. The emulsion may contain mustard, without specifying the mustard type.

EP 663 153 A1 relates to a new process for reducing the fat caloric content of food products containing fats or oils. The products may contain white mustard in combination with a fermented cereal.

CA 2 508 513 A1 discloses processes for production of products comprising yellow mustard gum. The gum is extracted from seeds. U.S. Pat. No. 4,980,186 relates to extraction of gum from yellow mustard seed.

WO 2013/092086 A1 relates to an edible oil-in-water emulsion that comprises a small quantity of ground pulse seed in combination with seed mucilage gum. The mucilage is extracted from the hull from mustard seed.

U.S. Pat. No. 4,062,979 discloses a process for manufacturing mustard flour. U.S. Pat. No. 4,498,598 also relates to the preparation of mustard flour, which has reduced pungency. This is obtained by heating the flour to a temperature ranging from 60 to 200° C., during a time period from 1 to 60 minutes.

US 2003/044507 A1 relates to egg yolk-containing, oil-in-water emulsified foods such as mayonnaise, tartar sauce and dressings. This document is silent on white or yellow mustard, as well as on grinding mustard seed in the presence of vinegar.

FR 2 349 284 A1 relates to oil-in-water emulsions particularly dressings and mayonnaises. This document is silent on white or yellow mustard, as well as on grinding mustard seed in the presence of vinegar.

EP 0 319 064 A2 relates to a process for the preparation of a water and oil emulsion comprising a phospholipoprotein containing material, which has been modified by phospholipase A, and at least one native starch based thickening agent. This document is silent on white or yellow mustard, as well as on grinding mustard seed in the presence of vinegar.

FR 2 291 707 A1 relates to oil-in-water emulsions containing an emulsion stabilizer.

WO 2004/056187 A1 relates to edible emulsions (e.g. dressings or sauces) for use with hot food products and to processes for preparing these emulsions.

US 2014/0272075 A1 (not pre-published) relates to an enhanced viscosity mustard paste. This document is silent about an oil-in-water emulsion comprising ground yellow mustard seed, and is also silent about enzyme modified egg yolk.

WO 2014/124032 A1 (not pre-published) relates to a deflavoured mustard paste. This document is silent about an oil-in-water emulsion comprising ground yellow mustard seed, and is also silent about enzyme modified egg yolk.

SUMMARY OF THE INVENTION

Mayonnaise has a specific structure, thickness, taste, mouthfeel, and stability during shelf-life, which is established by the high oil content. Many consumer love traditional mayonnaise, and when decreasing the oil level, the new product should not compromise on these properties in order to satisfy these consumers. Therefore there is an increasing demand for mayonnaise-type products having a lower oil content without compromise on the sensorial properties associated with full fat mayonnaise, such as thickness and mouthfeel. Moreover the products should have a low concentration of thickeners and other structurants which are considered to be artificial by the consumers.

We have now developed an oil-in-water emulsion containing ground white or yellow mustard seed and enzymatically modified egg yolk, that has a reduced oil content, and nevertheless has a structure and properties which are similar as a traditional full-fat mayo, and without adding other polymeric or oligomeric water structurants or using these ingredients at a low concentration only. The whole seeds of white or yellow mustard are needed, such that no process steps like dehulling or extraction of the seeds are needed. By using white or yellow mustard seed, a natural ingredient is used, which traditionally may be present in mayonnaise-type emulsions. Only grinding the whole seed, in the presence of water and vinegar, is sufficient to easily provide a material that can be used in the compositions of the invention and to provide a low oil emulsion without loss of texture and quality.

Accordingly in a first aspect the invention provides a composition in the form of an oil-in-water emulsion, comprising from 15% to 72% by weight of oil,
from 0.1% to 10% by weight of acid,
from 0.25% to 5% by weight of ground white or yellow mustard seed originating from the species *Sinapis alba* or *Brassica hirta*, wherein the ground white or yellow mustard seed is obtained by grinding white or yellow mustard seed in the presence of water and vinegar, from 0.5% to 10% by weight of egg yolk, wherein at least 25% by weight of the egg yolk has been modified by treatment with a phospholipase, preferably with phospholipase A2; and having a pH ranging from 3 to 5.

In a second aspect the present invention provides a method for making a composition according to the first aspect of the invention, comprising the steps:
a) mixing of the water, the acid, the egg yolk, and the ground mustard seed in a stirred vessel, wherein the ground white or yellow mustard seed is obtained by grinding white or yellow mustard seed in the presence of water and vinegar;
b) adding the oil to the mixture of step a) while stirring;
c) homogenising the mixture of step b) to create an oil-in-water emulsion wherein the oil droplets have a volume weighted mean droplet size D3,3 of less than 10 micrometer.

In a third aspect the present invention provides the use of ground white or yellow mustard seed as ingredient of an oil-in-water emulsion to reduce the concentration of oil in the emulsion, wherein the ground white or yellow mustard seed is obtained by grinding white or yellow mustard seed in the presence of water and vinegar, wherein the emulsion comprises egg yolk, and wherein at least 25% by weight of the egg yolk has been modified by treatment with a phospholipase.

DETAILED DESCRIPTION OF THE INVENTION

All percentages, unless otherwise stated, refer to the percentage by weight (wt %).

In here, white or yellow mustard seeds are considered to be synonyms. In many publications both white mustard seeds and yellow mustard seeds are used for the same seeds: both terms are used for the seeds from the species *Sinapis alba*. *Sinapis alba* is also sometimes referred to as *Brassica alba* or *Brassica hirta*. In here *Sinapis alba*, *Brassica alba* and *Brassica hirta* are considered to be the same species.

D4,3 is the volume weighted mean diameter of a set of droplets or particles. The volume based diameter equals the diameter of a sphere that has the same volume as a given particle (M. Alderliesten, Particle & Particle Systems Characterization 8 (1991) 237-241).

"Spoonable" means that a composition is semi-solid but not free-flowing on a time scale typical for eating a meal, meaning not free-flowing within a time period of an hour. A sample of such substance is able to be dipped with a spoon from a container containing the composition.

"Pourable" is understood to mean that a composition is free-flowing; generally a spoon is not required to take a sample from a container containing a pourable composition.

"Polymeric or oligomeric water structurant" is understood to mean that this is a compound or a mixture of compounds which is an oligomer (meaning a branched or unbranched molecule containing a maximum of 20 monomer units) or a polymer (meaning a branched or unbranched molecule containing more than 20 monomer units) which is dispersible in water or dissolves in water to thicken or bind the water and increase the viscosity of the mixture as compared to pure water. In here a "polymeric or oligomeric water structurant" does not originate from egg yolk, whole egg, enzyme modified egg yolk, egg yolk modified with phospholipase, egg yolk modified with phospholipase A2, white or yellow mustard seed, and ground white or yellow mustard seed, Except in the operating and comparative examples, or where otherwise explicitly indicated, all numbers in this description indicating amounts or ratios of material or conditions of reaction, physical properties of materials and/or use are to be understood as modified by the word "about".

In a first aspect the invention provides a composition in the form of an oil-in-water emulsion, comprising from 15% to 72% by weight of oil,
from 0.1% to 10% by weight of acid,
from 0.25% to 5% by weight of ground white or yellow mustard seed originating from the species *Sinapis alba* or *Brassica hirta*, wherein the ground white or yellow mustard seed is obtained by grinding white or yellow mustard seed in the presence of water and vinegar, from 0.5% to 10% by weight of egg yolk, wherein at least 25% by weight of the egg yolk has been modified by treatment with a phospholipase, preferably with phospholipase A2; and having a pH ranging from 3 to 5.

Preferably the composition is an edible emulsion. Examples of oil-in-water emulsions encompassed by the present invention include mayonnaise, dressings and sauces. Preferably, the oil-in-water emulsion is a mayonnaise or a sauce, most preferably a mayonnaise. Generally such a mayonnaise is spoonable.

Mayonnaise is generally known as a thick, creamy sauce that can be used as a condiment with other foods. Mayonnaise is a stable water-continuous emulsion of vegetable oil, egg yolk and either vinegar or lemon juice. In many countries the term mayonnaise may only be used in case the emulsion conforms to the 'standard of identity', which defines the composition of a mayonnaise. For example, the standard of identity may define a minimum oil level, and a minimum egg yolk amount. Also mayonnaise-like products having oil levels lower than defined in a standard of identity can be considered to be mayonnaises. These kind of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with oil levels ranging from 5% to 85% by weight of the product. Mayonnaises in the context of the present invention do not necessarily need to conform to a standard of identity in any country.

The term 'oil' as used herein refers to lipids selected from triglycerides, diglycerides, monoglycerides and combinations thereof. Preferably the oil in the context of this invention comprises at least 90 wt % of triglycerides, more preferably at least 95 wt %. Preferably the oil contains less than 20 wt % of solid oil at 5° C., preferably less than 10 wt % solid oil. More preferred the oil is free from solid oil at 5° C. Most preferred the oil is liquid at 5° C. Preferred oils for use in the context of this invention are vegetable oils which are liquid at 5° C. Preferably the oil comprises sunflower oil, rapeseed oil, olive oil, soybean oil, and combinations of these oils.

The composition of the invention contains from 15% to 72% by weight of oil. Preferably the composition of the invention comprises from 20% to 70% by weight of oil, preferably from 20% to 70% by weight of oil. Preferably the concentration of oil in the composition ranges from 20% to 69% by weight. Preferably the concentration of oil in the composition ranges from 20% to 68% by weight, preferably from 20% to 66% by weight, preferably from 20% to 65% by weight, preferably from 20% to 65% by weight. Preferably the amount of oil is at least 25% by weight, preferably at least 30% by weight, preferably at least 35% by weight. Any combination of ranges using these mentioned end point are considered to be part of the invention as well.

The acid used in the composition of the invention are regular acids typically used in food emulsions. The composition comprises from 0.1% to 10% by weight of acid, preferably from 0.1% to 5% by weight of acid, preferably from 0.1% to 2% by weight of acid. The acid preferably is selected from acetic acid, citric acid, lactic acid, phosphoric acid, and combinations thereof. Acetic acid may be added as a component of vinegar, and citric acid may be added as a component of lemon juice. The amount of acid is such that the pH ranges from 3 to 5, preferably from 3 to 4.6. Preferably the composition contains at least 0.2% by weight of free acetic acid. This way a natural preservation system is created to improve storage time of the composition.

The composition of the present invention comprises ground white or yellow mustard seed originating from the species *Sinapis alba* or *Brassica hirta*. These specific mustard seeds have the property that they can be used to provide additional structure to a mayonnaise which is reduced in oil content as compared to a traditional full-fat mayonnaise, without using additional polymeric water-structurants. Additionally, due to the colour of the ground seeds, they can be used in the emulsion without negatively affecting the colour or appearance of the emulsion.

Advantageously, the whole seed of the white or yellow mustard is used to prepare the ground mustard seed. Dehulling is not required, extraction of compounds from the seeds is not required, and drying the seeds is not required. Grinding of the whole seeds is required, which is a process well known to the skilled person. The ground white or yellow mustard seed is obtained by grinding white or yellow mustard seed in the presence of water and vinegar. Preferably the weight ratio between mustard seed and [water and vinegar] ranges from 1:2 to 1:9, preferably from 1:2.2 to 1:6. Preferably the pH of the aqueous mixture containing mustard seed is maximally 3.8. Preferably the amount of mustard seed in the mixture ranges from 10% to 30% by weight, preferably from 15% to 25% by weight. Preferably the amount of water and vinegar ranges from 70% to 90% by weight, preferably from 75% to 85% by weight. Preferably the temperature at which the grinding is done ranges from about 20° C. to 65° C., preferably from 40° C. to 60° C. Preferably a stone grinder is used to prepare the ground mustard seed. After the grinding the ground mustard seed is very fine, preferably having a volume weighted mean diameter D4,3 of the solid particles smaller than 150 micrometer, preferably smaller than 140 micrometer. Preferably the mustard oil droplets originating from the mustard seed have a volume weighted geometric mean diameter D4,3 of less than 1 micrometer. The advantage of using this material is that the emulsion containing this material is smoother than that with other ground mustard seeds.

The concentration of ground white or yellow mustard seed originating from the species *Sinapis alba* or *Brassica hirta* ranges from 0.25% to 5% by weight of the composition of the invention. Preferably the concentration of ground mustard seeds ranges from 0.3% to 4% by weight of the composition. More preferred the concentration of ground mustard seeds ranges from 0.4% to 3.5% by weight of the composition. These amounts of mustard seed are based on the amount of ground mustard seed as such.

Preferably the ground mustard seed is used in the form of a paste, which preferably contains about 10% to 30% ground mustard seed and 70% to 90% aqueous phase (including vinegar), preferably about 15% to 25% ground mustard seed and 75% to 85% aqueous phase (including vinegar). Such paste is generally the result of the wet grinding of the mustard seeds. The pH of such a paste preferably ranges from 2 to 4, preferably to maximally 3.6. Such pastes are supplied by for example Wisconsin Spice, Inc. (Berlin, WI, USA).

Yellow or white mustard seeds contain the glucosinolate sinalbin. This compound is converted with water into a range of isocyanate compounds, catalysed by the enzyme myrosinase. These compounds are naturally present in yellow mustard seed. Upon hydrolysis of sinalbin, p-hydroxybenzyl isothiocyanate is formed. This is a pungent compound, typical for mustard seeds. p-Hydroxybenzyl isothiocyanate is unstable and degrades in a few hours to 4-hydroxybenzyl alcohol and a thiocyanate ion, which are not pungent. The hydrolysis of sinalbin typically takes place upon the grinding of the seeds, and when the ground mustard seed has been brought into contact with water.

The hydrolysis of sinalbin can be prevented by heating whole yellow or white mustard seeds including hull with steam, to de-activate the enzyme myrosinase. This heating typically is done at a temperature of at least 72° C. The higher the temperature the shorter the time period that is required to heat the seeds. The advantage of this process is that mustard seeds are prepared which do not provide the pungent flavour, and nevertheless retain the functional structural properties to stabilise the emulsion of the invention. The seeds which are treated this way are generally called de-heated mustard seeds. Preferably de-heated mustard seeds are used in the composition of the invention. Preferably after the heating process the de-heated mustard seeds are dried at ambient temperature. Preferably after drying the de-heated mustard seed is ground, resulting into very fine ground mustard seed, in the form of a paste. Preferably the composition of the invention comprises the de-heated mustard seed which has been ground. The advantage of using this material is that the emulsion containing this material is smooth and has a very low mustard flavour. Such ground de-heated mustard is supplied by for example Wisconsin Spice, Inc. (Berlin, WI, USA), for example as De-heated white mustard paste D', or as 'Mustard Paste—Low Flavor (LF), Vers A'.

Preferably the concentration of isothiocyanates in the ground mustard seed is less than 10 milligram per kilogram of the ground seed. Preferably the concentration of allylisothiocyanate in the ground mustard seed is less than 10 milligram per kilogram of the ground seed. Preferably the concentration of p-hydroxybenzyl isothiocyanate in the ground mustard seed is less than 5 milligram per kilogram of the ground seed, preferably less than 2 milligram per kilogram of the ground seed, preferably less than 1 milligram per kilogram of the ground seed. The de-heated ground white or yellow mustard seed is less pungent than regular ground white or yellow mustard seed.

The emulsions of the present invention contain egg yolk. The presence of egg yolk may be beneficial for taste, emulsification and/or stability of the oil droplets in the composition of the invention. Egg yolk contains phospholipids, which act as emulsifier for the oil droplets. Preferably the concentration of egg yolk in the composition of the invention ranges from 1% to 8% by weight of the emulsion, more preferred from 2% to 6% by weight of the emulsion. The egg yolk may be added as egg yolk component, meaning largely without egg white. Alternatively, the composition may also contain whole egg, containing both egg white and egg yolk. The total amount of egg yolk in the composition of the invention includes egg yolk that may be present as part of whole egg. Preferably the concentration of phospholipids originating from egg yolk ranges from 0.05% to 1% by weight, preferably from 0.1% to 0.8% by weight of the emulsion.

Part of the egg yolk in the composition of the invention has been subjected to an enzymatic conversion process using phospholipase. Preferably the phospholipase that is used to treat egg yolk is phospholipase A2. This process leads to split off of fatty acid chains from the phospholipid molecules, and yields so-called enzyme-modified egg yolk. The reaction products of this enzymatic process are retained in the enzyme-modified egg yolk, meaning that the enzyme-modified egg yolk contains fatty acids split off from the phospholipids. The reaction products of a process with phospholipase A2 are mainly lysophosphatidylcholines (or lysolecithins) and fatty acids. The concentration of the phospholipids 1-lysophosphatidylcholine, 2-lysophosphatidylcholine, and lysophosphatidylethanolamine is increased as compared to the native egg yolk. By this hydrolysis, the emulsifying properties of the egg yolk can be tuned, while the egg yolk retains its organoleptic properties. A suitable source of enzyme modified egg yolk is 'Heat stabilised egg yolk (92-8)', supplied by Bouwhuis Enthoven (Raalte, the Netherlands). This sample contains 92% enzyme modified egg yolk and 8% table salt.

At least 25% by weight of the egg yolk has been modified by treatment with a phospholipase, preferably with phospholipase A2. The advantage of the use of the enzyme modified egg yolk is that the thickness of the emulsion is increased, as compared to the use of native egg yolk. Preferably maximally 90% by weight of the egg yolk has been modified by treatment with phospholipase, preferably with phospholipase A2. Preferably the concentration of egg yolk which has been modified by treatment with phospholipase ranges from 0.5% to 4% by weight of the composition, preferably from 1% to 4% by weight of the composition. Preferably the concentration of egg yolk which has been modified by treatment with phospholipase A2 ranges from 0.5% to 4% by weight of the composition, preferably from 1% to 4% by weight of the composition. Preferably the total concentration of 1-lysophosphatidylcholine and 2-lysophosphatidylcholine ranges from 0.02 to 0.2% by weight of the emulsion.

As already indicated herein before, many mayonnaise-type emulsions with reduced fat levels contain a structurant to stabilise the continuous water phase and to thicken the emulsion. Many structurants are oligomers or polymers from vegetable, microbial, or animal origin. The structurants can be water-soluble or water-insoluble, and they may be used native or in chemically or physically modified form. Examples of structurants from vegetable origin are water-soluble polysaccharides like native starches, chemically modified starches, carrageenan, locust bean gum, carboxymethyl cellulose, and pectin. Also oligosaccharides and polysaccharides present in corn syrup or glucose syrup may be used as structurant in mayonnaise-type emulsions. Additionally proteins from vegetable origin may be used as structurant in oil-in-water emulsions, for example ground pulse seed may be used to provide structure to an emulsion. Examples of water-insoluble structurants from vegetable origin are cellulosic fibres like citrus fibres and tomato fibres. Examples of structurants from microbial or algae origin are the polysaccharides xanthan gum, agar, and alginate. Examples of polymeric structurants from animal origin are proteins like casein from cow's milk and gelatin.

The advantage of the present invention is that the oil content of the emulsion can be reduced, without adding large amounts of polymers or oligomers to stabilise the aqueous phase. Preferably the concentration of polymeric or oligomeric water structurants is maximally 4% by weight of the emulsion. Preferably the concentration of polymeric or oligomeric water structurants is maximally 3% by weight of the emulsion. This preferred maximum concentration of polymeric or oligomeric water structurants is in particular relevant for compositions of the invention comprising from 20% to 50% oil, more preferred from 20% to 40% oil.

Preferably the concentration of polymeric or oligomeric water structurants is maximally 2% by weight of the emulsion, preferably maximally 1% by weight, preferably the composition is substantially free from polymeric or oligomeric water structurants. More preferred the composition of the invention is free from polymeric or oligomeric water structurants. Egg yolk, whole egg, enzyme modified egg yolk, egg yolk modified with phospholipase, egg yolk modified with phospholipase A2, ite or yellow mustard seed, and ground white or yellow mustard seed may also contain polymeric or oligomeric water structurants, and therefore the compounds originating from these sources are excluded from the definition of polymeric or oligomeric water structurants. Therefore most preferred the composition of the invention is free from polymeric or oligomeric water structurants which do not originate from egg yolk, whole egg, enzyme modified egg yolk, egg yolk modified with phospholipase, egg yolk modified with phospholipase A2, white or yellow mustard seed, or ground white or yellow mustard seed. Most preferred, these preferred maximum concentrations of polymeric or oligomeric water structurants are in particular applicable to compositions comprising oil at a concentration ranging from 50% to 70% by weight of the emulsion, preferably from 60% to 70% by weight of the emulsion. Preferably the concentration of oil ranges from 63% to 70% by weight, more preferred from 65% to 70% by weight. Preferably in this case the concentration of oil is maximally 69.5% by weight of the emulsion.

Preferably the concentration of starch, native starch, modified starch, gums, pectins, and other hydrocolloids which do not originate from egg yolk, whole egg, enzyme modified egg yolk, or white or yellow mustard seed in the composition of the invention is maximally 2% by weight, preferably maximally 1% by weight, preferably maximally 0.5% by weight, and more preferred maximally 0.1% by weight. More preferred the composition of the invention is substantially free from starch, native starch, modified starch, gums, pectins, and other hydrocolloids which do not originate from egg yolk, whole egg, enzyme modified egg yolk, or white or yellow mustard seed. Most preferred the composition of the invention is free from starch, native starch, modified starch, gums, pectins, and other hydrocolloids which do not originate from egg yolk, whole egg, enzyme modified egg yolk, or white or yellow mustard seed. Most preferred, these preferred maximum concentrations of starch, native starch, modified starch, gums, pectins, and other hydrocolloids which do not originate from egg yolk, whole egg, enzyme modified egg yolk, or white or yellow mustard seed, are in particular applicable to compositions comprising oil at a concentration ranging from 50% to 70% by weight of the emulsion, preferably from 60% to 70% by weight of the emulsion, preferably from 63% to 70% by weight of the emulsion. Preferably the concentration of oil ranges from 65% to 70% by weight. Preferably in this case the concentration of oil is maximally 69.5% by weight of the emulsion.

Preferably the concentration of insoluble fibre, preferably cellulose fibre, preferably citrus fibre, which do not originate from egg yolk, whole egg, enzyme modified egg yolk, or white or yellow mustard seed in the composition of the invention is maximally 1% by weight, preferably maximally 0.5% by weight, preferably maximally 0.1% by weight. More preferred the composition of the invention is substantially free from insoluble fibre, preferably cellulose fibre, preferably citrus fibre, which do not originate from egg yolk, whole egg, enzyme modified egg yolk, or white or yellow mustard seed. Most preferred the composition of the invention is substantially free from insoluble fibre, preferably cellulose fibre, preferably citrus fibre, which do not originate from egg yolk, whole egg, enzyme modified egg yolk, or white or yellow mustard seed.

Most preferred, these preferred maximum concentrations insoluble fibre, preferably cellulose fibre, preferably citrus fibre, which do not originate from egg yolk, whole egg, enzyme modified egg yolk, or white or yellow mustard seed, are in particular applicable to compositions comprising oil at a concentration ranging from 50% to 70% by weight of the emulsion, preferably from 63% to 70% by weight of the emulsion. Preferably the concentration of oil ranges from 65% to 70% by weight in this case. Preferably in this case the concentration of oil is maximally 69.5% by weight of the emulsion.

The composition of the invention typically is spoonable as opposed to solid or pourable. The firmness of the composition can be characterised by the Stevens value of the composition, which determines the hardness of the composition, preferably measured after storage for 1 week. Preferably the emulsion has a Stevens value at 20° C. of at least 70 gram. Preferably the emulsion has a Stevens value at 20° C. of at least 80 gram, preferably at least 100 gram, preferably ranging from 100 to 200 gram. More preferably the emulsion has a Stevens value at 20° C. ranging from 100 to 150 gram. The Stevens value is determined as defined here: the Stevens value is determined at 20° C. by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. The grid comprises 76 square openings of 3×3 mm, is made up of wire with a thickness of 1 mm, and has a diameter of 40 mm. This methodology is further described in the experimental section.

The viscosity of the present emulsion typically lies in the range of 100-80,000 mPa·s, more preferably in the range of 200-30,000 mPa·s. The viscosity can be determined using a Brookfield viscometer operated at 50 rpm and 20° C., using the appropriate spindle for the expected viscosity (according to ISO2555).

The oil-in-water emulsion of the present invention preferably has a storage modulus G', measured at 20° C., within the range of 100-3,500 Pa, more preferably in the range of 500-2,000 Pa.

The G' of the emulsion is measured using a standard protocol with the following consecutive steps. First the sample is rested for 3 minutes after the introduction into the rheometer to allow relaxation of the stresses accumulated due to the loading of the sample. Then a stress sweep is applied in which the oscillatory stress is increased from 0.1 to 1768 Pa in logarithmic steps (15 per decade). This step is terminated when the phase angle exceeds 80°. From this step the G' (storage modulus) is taken in the linear viscoelastic region as described below.

The storage modulus G' is the mathematical description of an object's or substance's tendency to be deformed elastically (i.e., non-permanently) when a force is applied to it. The term 'storage' in storage modulus refers to the storage of the energy applied to the sample. The stored energy is recovered upon the release of the stress. The storage modulus of an oil-in-water emulsion is suitably determined by a dynamic oscillatory measurement, where the shear stress is varied (from low to high stress) in a sinusoidal manner. The resulting strain and the phase shift between the stress and strain is measured. From the amplitude of the stress and the strain and the phase angle (phase shift) the storage modulus is calculated. Herein, the G' (Pa) is taken at the plateau value at low stress (linear viscoelastic region). For these measurement a suitable rheometer is used (e.g. a AR2000 rheometer from TA Instruments, New Castle, DE, USA).

The emulsion may suitably contain one or more additional ingredients which are common to mayonnaise-type emulsions. Examples of such optional ingredients include salt, spices, sugars (in particular mono- and/or disaccharides), vitamins, flavouring, colouring, preservatives, antioxidants, chelators, herbs and vegetable pieces. Such optional additives, when used, collectively do not make up more than 40%, more preferably not more than 20% by weight of the emulsion.

One of the advantages of the composition of the invention is that is heat-stable, and can be used like full-fat traditional mayonnaise in warm applications.

In a second aspect the present invention provides a method for making a composition according to the first aspect of the invention, comprising the steps:

a) mixing of the water, the acid, the egg yolk, and the ground mustard seed in a stirred vessel, wherein the ground white or yellow mustard seed is obtained by grinding white or yellow mustard seed in the presence of water and vinegar;

b) adding the oil to the mixture of step a) while stirring;

c) homogenising the mixture of step b) to create an oil-in-water emulsion wherein the oil droplets have a volume weighted mean droplet size D3,3 of less than 10 micrometer.

The homogenisation in step c) is done during a time period long enough that the dispersed oil phase typically has a volume weighted geometric mean diameter D3,3 of less than 10 micrometer, preferably from 0.3 to 10 micrometer, preferably from 0.5 to 8 micrometer. Preferably the oil droplets of the emulsion obtained in step c) have a volume weighted geometric mean droplet size D3,3 of less than 6 micrometer. This mean diameter may suitably be determined using the method described by Goudappel et al. (Journal of Colloid and Interface Science 239, p. 535-542, 2001). Typically, 80 to 100% of the total volume of the oil droplets contained in the present emulsion have a diameter of less than 15 micrometer, more preferably a diameter ranging from 0.5 to 10 micrometer.

The homogenisation may be done using a conventional mixer for preparing oil-in-water emulsions, such as a colloid mill, or another mill as described in WO 02/069737 A2. A suitable supplier of such emulsification equipment is Charles Ross & Son Company, (Hauppauge, New York, USA).

Preferably, in step c) the homogenisation is performed using a colloid mill operating at a rotation rate ranging from 2,000 to 14,000 rpm. The use of the white mustard paste has the advantage that a lower rotation speed of the colloid mill is required than for preparing an emulsion without white mustard paste. Still an emulsion having a spoonable thickness, preferably characterised by a Stevens value of at least 70 g, can be prepared. This way energy can be saved in the production process. The actual rotation rate will be dependent on the scale of the colloid mill. A colloid mill having a larger diameter than another colloid mill, requires a smaller rotation rate to achieve the same linear speed of the rotor of the colloid mill than the smaller mill.

In a third aspect the present invention provides the use of ground white or yellow mustard seed as ingredient of an oil-in-water emulsion to reduce the concentration of oil in the emulsion, wherein the ground white or yellow mustard seed is obtained by grinding white or yellow mustard seed in the presence of water and vinegar, wherein the emulsion comprises egg yolk, and wherein at least 25% by weight of the egg yolk has been modified by treatment with a phospholipase, preferably with a phospholipase A2. The ground white or yellow mustard seed is obtained by grinding ground white or yellow mustard seed in the presence of water. Preferably the ground mustard seed is used in the form of a paste, which typically may contain about 20% ground mustard seed and 80% vinegar. Such paste is then the result of the wet grinding of the mustard seeds.

Preferred aspects described in the context of the first or second aspect of the invention are applicable to this third aspect of the invention, mutatis mutandis.

DESCRIPTION OF FIGURES

FIG. 1: Picture of grid used for determining the Stevens value of oil-in-water emulsions as used herein.

EXAMPLES

The following non-limiting examples illustrate the present invention.

Raw Materials

Superfine ground yellow mustard #211, ex G. S. Dunn Limited (Hamilton, Ontario, Canada); dry powder prepared from whole mustard seed.

Pure yellow mustard flour #106, ex G. S. Dunn Limited (Hamilton, Ontario, Canada); dry powder prepared from the endosperm of the mustard seed (excluding the hull).

Fine yellow mustard bran #412, ex G. S. Dunn Limited (Hamilton, Ontario, Canada); dry powder prepared from the hull of the mustard seed.

Mustard DV15, ex Kühne (Hamburg, Germany); a mustard paste containing 20% of ground mustard seed and 80% water and vinegar.

White mustard paste, high solids, ex Wisconsin Spice, Inc. (Berlin, WI, USA); a viscous paste containing 20 wt % ground whole mustard seed, water, and vinegar.

De-heated white mustard paste D, ex Wisconsin Spice, Inc. (Berlin, WI, USA); a viscous paste containing 20 wt % ground mustard seed and vinegar; the enzyme myrosinase has been inactivated by subjecting the seed to a humidity-time-temperature treatment.

The following egg preparations were all obtained from Bouwhuis Enthoven (Raalte, the Netherlands):

Egg blend of whole egg and egg yolk, used in examples 1 and 3;

Enzyme modified egg yolk (egg yolk treated with phospholipase A2, fragments are retained in the product);

Egg yolk

Enzyme modified egg blend (egg blend mentioned above, treated with phospholipase A2, fragments are retained in the product).

Soybean oil ex Cargill (Amsterdam, The Netherlands).

Modified Starch: Thermflo, a modified food starch derived from waxy maize ex Ingredion (Bridgewater, NJ, USA).

Sugar: sucrose white sugar W4 ex Suiker Unie (Oud Gastel, Netherlands).

Sorbic acid: ex Univar (Zwijndrecht, Netherlands).

Vinegar: 12% Branntweinessig ex Carl Kühne (Hamburg, Germany).

Lemon juice: concentrate 45° brix ex Döhler (Darmstadt, Germany).

Salt: NaCl suprasel ex Akzo Nobel (Amersfoort, Netherlands).

EDTA: Dissolvine E-CA-10 ex Akzo Nobel (Amersfoort, Netherlands).

Xanthan gum: FNCS ex Jungbunzlauer (Basel, Switzerland).

Guar gum: type 2463 ex Willy Benecke GmbH (Hamburg, Germany).

Potassium sorbate: granules ex Daicel Nanning Food Ingredients Co. Ltd.

Methods

Thickness—Stevens value: the Stevens value is determined at 20° C. by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. One end of a shaft is connected to the probe of the texture analyser, while the other end is connected to the middle of the grid. The grid is positioned on the flat upper surface of the emulsion in the cup. Upon starting the penetration test, the grid is slowly pushed downward into the emulsion by the texture analyser. The final force exerted on the probe is recorded and translated into the Stevens value in gram. A photograph of the grid is given in FIG. 1. The grid is made from stainless steel, and has 76 holes, each hole having a surface area of approximately 3×3 mm.

Syneresis: Syneresis in an oil-in-water emulsion is the expelling of aqueous liquid, which separates from the product during storage after disrupting the structure by e.g. spooning. In this test gravimetric drip of expelled water from an oil-in-water emulsion into an acrylic cylinder is determined during a storage period at various climate conditions.

Materials: Acrylic cylinder (length 45 mm, inner diameter 21 mm, wall thickness 2 mm, open at two ends) and qualitative filter paper, type 415, diameter 75 mm (ex VWR, Amsterdam, Netherlands). The filter is applied at one end of the cylinder and attached to the outside cylinder wall by adhesive tape. The tube with filter is vertically inserted into an emulsion sample of 225 mL in a jar, until the top of the cylinder is at level with the emulsion surface. The jar is closed with a lid, and stored at 5° C. or 20° C. The amount of liquid in the tube after storage is determined by taking out the liquid from the tube (which has passed through the filter into the tube) with a pipette, and weighing the amount of liquid (in gram) after a determined amount of time. The lower the syneresis value, the better for the stability of the emulsion. Usually measurements are done in duplicate.

Example 1: Influence of Mustard Type on Thickness of Emulsions

Various ground mustard seed types were used to prepare mayonnaise-type oil-in-water emulsions, to show the effect of the mustard type on Stevens value and syneresis. The emulsions contained 72% oil, and were free from enzyme modified egg yolk, therefore these experiments only show the effect of the various mustard sources. The compositions of the prepared products are given in Table 1, and the influence of the various mustard types was tested at two concentrations.

TABLE 1

Composition of emulsions containing various mustard seed preparations.

| Ingredient | 1 [wt %] | 2 [wt %] | 3-1 [wt %] | 3-2 [wt %] | 4-1 [wt %] | 4-2 [wt %] |
|---|---|---|---|---|---|---|
| Soybean oil | 75 | 72 | 72 | 72 | 72 | 72 |
| Water | to 100% | to 100% | to 100% | to 100% | to 100% | to 100% |
| Egg blend | 6.7 | 6.7 | 6.7 | 6.7 | 6.7 | 6.7 |
| Sugar | 1.3 | 1.4 | 1.4 | 1.4 | 1.4 | 1.4 |
| Salt | 1.7 | 1.8 | 1.6 | 1.6 | 1.6 | 1.6 |
| Vinegar | 2.5 | 2.6 | 2.1 | 2.1 | 2.1 | 2.1 |
| Flavouring and spices | 0.3 | 0.3 | 0.3 | 0.3 | 0.3 | 0.3 |
| Mustard types [#] | | | | | | |
| White mustard paste, high solids | | | 1.5 | 3.0 | | |
| Mustard DV15 | | | | | 1.5 | 3.0 |

| Ingredient | 5-1 [wt %] | 5-2 [wt %] | 6-1 [wt %] | 6-2 [wt %] | 7-1 [wt %] | 7-2 [wt %] |
|---|---|---|---|---|---|---|
| Soybean oil | 72 | 72 | 72 | 72 | 72 | 72 |
| Water | to 100% | to 100% | to 100% | to 100% | to 100% | to 100% |
| Egg blend | 6.7 | 6.7 | 6.7 | 6.7 | 6.7 | 6.7 |
| Sugar | 1.4 | 1.4 | 1.4 | 1.4 | 1.4 | 1.4 |
| Salt | 1.8 | 1.8 | 1.8 | 1.8 | 1.8 | 1.8 |
| Vinegar | 2.4 | 2.4 | 2.4 | 2.4 | 2.4 | 2.4 |
| Flavouring and spices | 0.3 | 0.3 | 0.3 | 0.3 | 0.3 | 0.3 |
| Mustard types [#] | | | | | | |
| Superfine ground yellow mustard #211 | 0.3 | 0.6 | | | | |
| Pure yellow mustard flour #106 | | | 0.3 | 0.6 | | |
| Fine yellow mustard bran #412 | | | | | 0.3 | 0.6 |

[#] mustard pastes contain 20% mustard seed, and at a dosage of 3% mustard paste, this corresponds to 0.6% mustard powder in the recipe.

The emulsions were prepared according to the following process. Egg blend, mustard source and aqueous phase were mixed in a 60 L agitated pre-emulsion vessel (Jongia N750, Leeuwarden, The Netherlands). The oil phase was dosed, while continuously stirring. After all oil had been dosed, stirring was continued for 10 seconds. This pre-emulsion was pumped through a colloid mill (ex Charles Ross & Son, Hauppage, New York, USA) for emulsification. Emulsification was done at rotation speeds between 7,000 and 14,000 rpm. Emulsions were collected in glass jars and consistency (Stevens value) was measured after 1 week storage time.

TABLE 2

Thickness of emulsions, compositions in Table 1, expressed as Stevens value in gram at 20° C. after 1 week storage, as function of mustard source concentration and of emulsification device speed.

| Sample # | Mustard source concentration [wt %] | 7,000 rpm | 8,000 rpm | 9,000 rpm | 10,000 rpm | 11,000 rpm | 12,000 rpm | 14,000 rpm |
|---|---|---|---|---|---|---|---|---|
| 1 | 0 | | 130 | 140 | 150 | 150 | 150 | |
| 2 | 0 | | | | 100 | 120 | 110 | |
| 3-1 | 1.5 | | | 130 | 110 | | | |
| 3-2 | 3.0 | 110 | 120 | 130 | 160 | 150 | 160 | |
| 4-1 | 1.5 | | | | 81 | | 100 | 120 |
| 4-2 | 3.0 | | | | 90 | | 120 | |
| 5-1 | 0.3 | | | 100 | 120 | | | |
| 5-2 | 0.6 | | | 120 | 120 | | | |
| 6-1 | 1.5 | | | | 110 | | | |
| 6-2 | 3.0 | | | 90 | 100 | | | |
| 7-1 | 1.5 | | | 120 | 120 | | | |
| 7-2 | 3.0 | | | 100 | 110 | | | |

At a concentration of 0.3% ground mustard seed (or 1.5% mustard paste), the Stevens value of all samples was not as high as the target product containing 75% oil (sample 1). The sample containing 72% oil without mustard seed (sample 2) had a lower Stevens value than the samples containing mustard seed. The highest Stevens value was obtained using white mustard paste, high solids (samples 3-1, 3-2).

At the higher concentration of 3% mustard paste (corresponding to 0.6% ground mustard powder), emulsions were prepared containing 72% oil, which had the similar Stevens value as the emulsion with 75% oil (without mustard seed preparation). In particular the emulsions containing white mustard paste, high solids (samples 3-1, 3-2), gave good results and thickness on Stevens value.

The variation in rotation speed of the emulsification device shows that the Stevens value of reference sample 1 (75% oil) as well as sample 3-2 with white mustard paste, high solids increased until 11,000 rpm. The Stevens value of reference sample 1 then decreased upon further increase of the rotation speed. This behaviour is also shown for sample 2 (72% oil).

The emulsions containing either of the dry samples ground yellow mustard #211(5-1, 5-2), or yellow mustard flour #106 (6-1, 6-2), or yellow mustard bran #412 (7-1, 7-2) did not have a Stevens value which was as high as the samples with white mustard paste, high solids (3-1, 3-2).

Also syneresis was determined for these samples as function of the rotation speed:

TABLE 3

Syneresis of emulsions, compositions in Table 1, expressed as gram drained liquid in gram after 4 weeks storage at 20° C., as function of mustard source concentration and of emulsification device speed.

| Sample # | Mustard source concentration [wt %] | 8,000 rpm | 9,000 rpm | 10,000 rpm | 11,000 rpm |
|---|---|---|---|---|---|
| 1 | 0 | | 3 | 2 | 2 |
| 2 | 0 | | | 5 | 4 |
| 3-1 | 1.5 | | 3 | | |
| 3-2 | 3.0 | 3 | 2 | | |
| 4-1 | 1.5 | | | | |
| 4-2 | 3.0 | 3 | | | |
| 5-1 | 0.3 | | | 3 | |
| 5-2 | 0.6 | | 4 | | |
| 6-1 | 1.5 | | | | 4 |
| 6-2 | 3.0 | 5 | 4 | 3 | |
| 7-1 | 1.5 | | | 2 | |
| 7-2 | 3.0 | | 3 | 2 | 1 |

These results show that better syneresis values are obtained when the rotation speed increases. When using White mustard paste, high solids (samples 3-1, 3-2), the increase of the mustard concentration leads to lower syneresis. The syneresis value of 1.6 g is the lowest syneresis for the emulsions containing the various mustard seed preparations, at a relatively low rotation speed of the colloid mill. This means that emulsions with a good consistency can be prepared with a relatively low energy input.

Example 2: Influence of Enzyme Modified Egg Yolk on Thickness of Emulsions

Emulsions were prepared with a largely similar recipe as sample #3 in Table 1, using White mustard paste, high solids (ex Wisconsin Spice, Inc.). The composition of the egg phase was varied, and the use of the white mustard paste, as is indicated in Table 4.

Water was used as the balance ingredient for these compositions. The same process and equipment was used as in example 1, and the colloid mill was operated at rotation rates 8,000 to 10,000 rpm.

TABLE 4

Composition of emulsions containing 72% oil, various amounts of enzyme modified egg yolk and white mustard paste, high solids, and the Stevens value at 20° C. after 1 week storage.

| Sample # | Egg blend [wt %] | Enzyme modified egg blend [wt %] | White mustard paste [wt %] | Stevens value at 20° C. [g] 8,000 rpm | 9,000 rpm | 10,000 rpm |
|---|---|---|---|---|---|---|
| 3-3 | | 6.7 | 0 | 170 | 170 | 220 |
| 3-4 | | 6.7 | 3 | 210 | 240 | 270 |
| 3-5 | | 6.2 | 0 | 150 | 180 | 210 |
| 3-6 | | 6.2 | 3 | 170 | 210 | 220 |
| 2 * | 6.7 | | 0 | | | 100 |
| 3-2 * | 6.7 | | 3 | 120 | 130 | 160 |

* samples and data from Table 1

These results show that the use of the white mustard paste leads to higher Stevens values as compared to samples without mustard paste. Replacing part of the native egg yolk with enzyme modified egg yolk also leads to higher Stevens values, even higher than for the mayonnaise containing 75% oil, which is the target (sample 1 in Table 1 and Table 2).

These results also show that with increasing colloid mill rotation speed, the Stevens value increases. By using white mustard paste, possibly in combination with enzyme modified egg yolk, the rotation speed of the colloid mill can be decreased, as compared to compositions with higher oil levels without white mustard paste and possibly enzyme modified egg yolk. Still a thickness can be obtained which is required for this kind of products, and which is not too high. This way energy can be saved when producing as compared to standard production methods.

Four further emulsions were prepared with a largely similar recipe as sample #3 in Table 1, using White mustard paste, high solids (ex Wisconsin Spice, Inc.). The composition of the egg phase was varied, and the use of the white mustard paste, as is indicated in Table 5. Water was used as the balance ingredient for these compositions. The same process and equipment was used as in example 1, and the colloid mill was operated at rotation rates 8,000 to 10,000 rpm.

TABLE 5

Composition of emulsions containing 72% oil, various amounts of enzyme modified egg yolk and white mustard paste, and the Stevens value at 20° C. after 1 week storage.

| Sample # | Enzyme modified egg blend [wt %] | White mustard paste [wt %] | Stevens value at 20° C. [g] 12,000 rpm | 14,000 rpm |
|---|---|---|---|---|
| 3-7 | 5.6 | 0 | 120 | 160 |
| 3-8 | 5.6 | 3 | 210 | 240 |
| 3-9 | 5.2 | 0 | 150 | 190 |
| 3-10 | 5.2 | 3 | 190 | 230 |

Example 3: Influence of Egg Type on Thickness of Emulsions

The White mustard paste, high solids (ex Wisconsin Spice Inc.) as used in example 1 was used to prepare mayonnaise-type oil-in-water emulsions with two types of egg sources. The compositions of the prepared products and the measured Stevens values and syneresis values are given in Table 6. These emulsions were prepared using the same process as described in example 1, using a colloid mill operating at a rotation speed of 10,000 rpm.

TABLE 6

Composition of emulsions containing various egg types and white mustard paste, high solids.

| Ingredient | 19 [wt %] | 20 [wt %] | 21 [wt %] | 22 [wt %] |
|---|---|---|---|---|
| Soybean oil | 66 | 66 | 66 | 66 |
| Egg blend | | | 4.1 | 4.1 |
| Enzyme modified egg blend | 4.1 | 4.1 | | |
| Water | to 100% | to 100% | to 100% | to 100% |
| Sugar | 1.5 | 1.5 | 1.5 | 1.5 |
| Salt | 1.5 | 1.5 | 1.5 | 1.5 |
| Vinegar | 2.4 | 2.0 | 2.4 | 2.0 |
| Flavouring and spices | 0.3 | 0.3 | 0.3 | 0.3 |
| White mustard paste, high solids | | 3.0 | | 3.0 |
| Stevens value [g] | 90 | 140 | 40 | 40 |
| Syneresis [g] | 3 | 1 | 10 | 10 |

These results show that by combining white mustard paste with enzyme modified egg yolk the compositions of the invention have a consistency which is similar to that of current mayonnaise with higher oil content. The presence of white mustard paste leads to a strong increase of Stevens value of emulsions as compared to the compositions without white mustard paste. Additionally the combination of enzyme modified egg yolk with white mustard paste improves the stability of the emulsion to syneresis.

Example 4: Emulsions Containing De-Heated White Mustard Paste

Emulsions were prepared with a largely similar recipe as sample #3 in Table 1, this time using De-heated white mustard paste D (ex Wisconsin Spice, Inc.). The composition of the egg phase was varied, as well as the concentration of the de-heated white mustard paste, as indicated in Table 7. Water was used as the balance ingredient. The same process was used as in example 1. The rotation speed of the colloid mill was varied from 12,000 to 14,000 rpm.

TABLE 7

Composition of emulsions containing 70% oil, enzyme modified egg yolk, and varying amounts of de-heated white mustard paste, and the Stevens value at 20° C. after 1 week storage.

| Sample # | Oil content [wt %] | Enzyme modified Egg blend [wt %] | Enzyme modified egg blend [wt %] | De-heated white mustard paste [wt %] | Stevens value at 20° C. [g] 12,000 rpm | Stevens value at 20° C. [g] 14,000 rpm |
|---|---|---|---|---|---|---|
| 30 | 70 | | 6.3 | 1% | 150 | 200 |
| 31 | 70 | | 6.3 | 2% | 170 | 220 |
| 32 | 72 | 7.3 | | 1.5% | 130 | 160 |
| 33 | 72 | 7.3 | | 3.0% | 150 | 180 |
| 34 | 70 | 7.3 | | 3.0% | 130 | 160 |

These compositions show that emulsions containing only 1% of de-heated white mustard paste have a consistency which is comparable to the samples containing white mustard paste, high solids (3-4, 3-6 in Table 4). The taste and flavour of these emulsions was similar to regular emulsions without mustard paste.

The concentrations of allylisothiocyanate and p-hydroxybenzyl isothiocyanate was determined in the white mustard paste, high solids, and de-heated white mustard paste. The concentrations were the following:

TABLE 8

Concentration of of allylisothiocyanate and p-hydroxybenzyl isothiocyanate as determined in mustard pastes

| | Concentration allylisothiocyanate [mg/kg] | Concentration p-hydroxybenzyl isothiocyanate [mg/kg] |
|---|---|---|
| White mustard paste high solids | 2.1 | <1 |
| De-heated white mustard paste D | 1.7 | <1 |

This shows that the de-heated white mustard paste has a lower concentration of isothiocyanate compounds than the regular white mustard paste.

Example 5: Emulsions with 25% and 50% Oil

Oil-in-water emulsions containing low amounts of oil, 25% and 50%, respectively, were prepared. The influence of the presence of enzyme modified egg yolk and white mustard paste on the thickness of the emulsion (Stevens value) was determined. The composition of the emulsions that were prepared is given in Table 9 and Table 10. The process to prepare these emulsions was the following. The ingredients of the starch phase were dispersed in water. The mix was heated in a jacketed stirred vessel to 85° C. and kept at that temperature for a minimum of 5 minutes. Subsequently the mixture was cooled to 25° C. and kept at this temperature until use. The oil phase was prepared by mixing oil-soluble flavours and oil, and this was kept until use. The aqueous phase was prepared by dispersing vinegar and white mustard paste in water. A pre-emulsion of total 50 kg (excluding the starch phase) was prepared for each sample following the method according to the second aspect of the invention. The pre-emulsions were further emulsified at a flow rate of 200 kg/h using the colloid mill described in example 1. After emulsification, the emulsified product was mixed with the starch phase. Finished emulsions were packed and stored at ambient temperature.

TABLE 9

Composition of emulsions containing 25% oil, enzyme modified egg yolk, and varying amounts of white mustard paste, and the Stevens value at 20° C. after 1 week storage.

| Ingredient | Sample 41 Conc. [wt %] | Sample 42 Conc. [wt %] | Sample 43 Conc. [wt %] | Sample 44 Conc. [wt %] |
|---|---|---|---|---|
| Enzyme modified egg yolk | 1.5 | 1.5 | | |
| Egg yolk | | | 1.5 | 1.5 |
| Demineralised water | To 100% | To 100% | To 100% | To 100% |
| Vinegar | 3.1 | 2.5 | 3.1 | 2.5 |
| Modified starch | 4.0 | 4.0 | 4.0 | 4.0 |
| Sugar | 2.2 | 2.2 | 2.2 | 2.2 |
| Salt | 1.7 | 1.7 | 1.7 | 1.7 |
| Xanthan and guar gum | 0.1 | 0.1 | 0.1 | 0.1 |
| Potassium sorbate | 0.10 | 0.10 | 0.10 | 0.10 |
| Soybean oil | 25.0 | 25.0 | 25.0 | 25.0 |
| Flavouring and spices | 0.2 | 0.2 | 0.2 | 0.2 |
| White mustard paste, high solids | | 3.0 | | 3.0 |
| Stevens value [g] | 75 | 85 | 41 | 41 |

TABLE 10

Composition of emulsions containing 50% oil, enzyme modified egg yolk, and varying amounts of de-heated white mustard paste, and the Stevens value at 20° C. after 1 week storage.

| Ingredient | Sample 45 Conc. [wt %] | Sample 46 Conc. [wt %] | Sample 47 Conc. [wt %] | Sample 48 Conc. [wt %] |
|---|---|---|---|---|
| Enzyme modified egg yolk | 5.5 | 5.5 | | |
| Egg yolk | | | 5.5 | 5.5 |
| Demineralised water | To 100% | To 100% | To 100% | To 100% |
| Modified starch | 3 | 3 | 3 | 3 |
| Salt | 1.6 | 1.6 | 1.6 | 1.6 |
| Sugar | 1.3 | 1.3 | 1.3 | 1.3 |
| Vinegar | 2.5 | 1.7 | 2.5 | 1.7 |
| Flavouring and spices | 0.2 | 0.2 | 0.2 | 0.2 |
| Soybean oil | 50.0 | 50.0 | 50.0 | 50.0 |
| White mustard paste, high solids | | 3.0 | | 3.0 |
| Stevens value [g] | 290 | 330 | 130 | 120 |

The combination of white mustard paste and enzyme modified egg yolk leads to a strong increase of the Stevens value, as compared to emulsions with native egg yolk, and compared to compositions without mustard paste.

The invention claimed is:
1. A composition in the form of an oil-in-water emulsion, comprising
from 60% to 72% by weight of oil,
from 0.1% to 10% by weight of acid,
from 0.5% to 10% by weight of egg yolk,
from 0.4% to 3.5% by weight of ground white or yellow mustard seed originating from the species *Sinapis alba* or *Brassica hirta*, wherein the ground white or yellow mustard seed is obtained by grinding whole white or yellow mustard seeds in the presence of water and vinegar to form a paste, wherein the whole white or yellow mustard seeds have de-activated myrosinase enzyme; wherein the weight ratio between mustard seed and [water and vinegar] ranges from 1:2 to 1:9; wherein the concentration of isothiocyanates in the ground mustard seed is less than 10 milligram per kilogram of the ground seed; and
wherein the ground mustard seed is used in the form of a paste, containing 10% to 30% ground mustard seed and 70% to 90% aqueous phase, including vinegar,
wherein at least 25% by weight of the egg yolk has been modified by treatment with a phospholipase;
wherein the composition has a pH ranging from 3 to 5; and
wherein the composition is a mayonnaise, and
wherein the concentration of polymeric or oligomeric water structurants not originating from egg yolk or white mustard seed is maximally 1% by weight of the emulsion, and wherein the structurant is a compound or a mixture of compounds which is an oligomer (meaning a branched or unbranched molecule containing a maximum of 20 monomer units) or a polymer (meaning a branched or unbranched molecule containing more than 20 monomer units) which is dispersible in water or dissolves in water to thicken or bind the water and increase the viscosity of the mixture as compared to pure water, and wherein the structurant does not originate from egg yolk, whole egg, enzyme modified egg yolk, egg yolk modified with phospholipase, egg yolk modified with phospholipase A2, white or yellow mustard seed, and ground white or yellow mustard seed,
wherein the emulsion has a Stevens value at 20° C. of at least 130 gram, and wherein the Stevens value is determined by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises 76 square openings of approximately 3×3 mm, is made up of wire with a thickness of approximately 1 mm, and has a diameter of 40 mm;
wherein the composition is substantially free from starch, native starch, modified starch, gums, pectins, and other hydrocolloids which do not originate from egg yolk, whole egg, enzyme modified egg yolk, or white or yellow mustard seed.

2. A composition according to claim 1, containing from 60% to 70% by weight of oil.

3. A composition according to claim 1, wherein the concentration of egg yolk which has been modified by treatment with phospholipase ranges from 0.5% to 4% by weight of the composition.

4. A composition according to claim 1, wherein the composition is free from polymeric or oligomeric water structurants.

5. The composition of claim 1, wherein at least 25% by weight of the egg yolk has been modified by treatment with phospholipase A2.

6. The composition of claim 1, wherein the whole white or yellow mustard seeds have been heated whole to a temperature of at least 72° C.

7. The composition of claim 6, wherein the heating is done with steam.

8. A composition in the form of an oil-in-water emulsion, comprising
from 60% to 72% by weight of oil,
from 0.1% to 10% by weight of acid,
from 0.5% to 10% by weight of egg yolk,
from 0.4% to 3.5% by weight of ground white or yellow mustard seed originating from the species *Sinapis alba* or *Brassica hirta*, wherein the ground white or yellow mustard seed is obtained by grinding whole white or yellow mustard seeds in the presence of water and vinegar to form a paste, wherein the weight ratio between mustard seed and [water and vinegar] ranges from 1:2 to 1:9; wherein the concentration of isothiocyanates in the ground mustard seed is less than 10 milligram per kilogram of the ground seed; and
wherein the ground mustard seed is used in the form of a paste, containing 10% to 30% ground mustard seed and 70% to 90% aqueous phase, including vinegar,
wherein the composition has a pH ranging from 3 to 5; and
wherein the composition is a mayonnaise, and
wherein the concentration of polymeric or oligomeric water structurants not originating from egg yolk or white mustard seed is maximally 1% by weight of the emulsion, and wherein the structurant is a compound or a mixture of compounds which is an oligomer (meaning a branched or unbranched molecule containing a maximum of 20 monomer units) or a polymer (meaning a branched or unbranched molecule containing more than 20 monomer units) which is dispersible in water or dissolves in water to thicken or bind the water and increase the viscosity of the mixture as compared to pure water, and wherein the structurant does not originate from egg yolk, whole egg, enzyme modified egg yolk, egg yolk modified with phospholipase, egg yolk modified with phospholipase A2, white or yellow mustard seed, and ground white or yellow mustard seed,
wherein the emulsion has a Stevens value at 20° C. of at least 130 gram, and wherein the Stevens value is determined by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises 76 square openings of approximately 3×3 mm, is made up of wire with a thickness of approximately 1 mm, and has a diameter of 40 mm,
wherein the composition is substantially free from starch, native starch, modified starch, gums, pectins, and other hydrocolloids which do not originate from egg yolk, whole egg, enzyme modified egg yolk, or white or yellow mustard seed.

9. The composition of claim 8, wherein the grinding of whole white or yellow mustard seeds in the presence of water and vinegar is done at a pH of 2-4.

10. The composition according to claim 8, containing from 60% to 70% by weight of oil.

11. The composition according to claim 8, wherein the composition is free from polymeric or oligomeric water structurants.

12. The composition of claim 8, wherein the whole white or yellow mustard seeds have been heated whole to a temperature of at least 72° C.

13. The composition of claim 12, wherein the heating is done with steam.

14. A composition in the form of an oil-in-water emulsion, comprising
from 60% to 72% by weight of oil,
from 0.1% to 10% by weight of acid,
from 0.5% to 10% by weight of egg yolk,
from 0.4% to 3.5% by weight of ground white or yellow mustard seed originating from the species *Sinapis alba* or *Brassica hirta*, wherein the ground white or yellow mustard seed is obtained by grinding whole white or yellow mustard seeds in the presence of water and vinegar to form a paste, wherein the weight ratio between mustard seed and [water and vinegar] ranges from 1:2 to 1:9; wherein the concentration of isothiocyanates in the ground mustard seed is less than 10 milligram per kilogram of the ground seed; and
wherein the ground mustard seed is used in the form of a paste, containing 10% to 30% ground mustard seed and 70% to 90% aqueous phase, including vinegar,
wherein the composition has a pH ranging from 3 to 5;
wherein the concentration of polymeric or oligomeric water structurants not originating from egg yolk or white mustard seed is maximally 1% by weight of the emulsion, and wherein the structurant is a compound or a mixture of compounds which is an oligomer (meaning a branched or unbranched molecule containing a maximum of 20 monomer units) or a polymer (meaning a branched or unbranched molecule containing more than 20 monomer units) which is dispersible in water or dissolves in water to thicken or bind the water and increase the viscosity of the mixture as compared to pure water, and wherein the structurant does not originate from egg yolk, whole egg, enzyme modified egg yolk, egg yolk modified with phospholipase, egg yolk modified with phospholipase A2, white or yellow mustard seed, and ground white or yellow mustard seed,
wherein the emulsion has a Stevens value at 20° C. of at least 130 gram, and wherein the Stevens value is determined by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises 76 square openings of approximately 3×3 mm, is made up of wire with a thickness of approximately 1 mm, and has a diameter of 40 mm,
wherein the composition is substantially free from starch, native starch, modified starch, gums, pectins, and other hydrocolloids which do not originate from egg yolk, whole egg, enzyme modified egg yolk, or white or yellow mustard seed.

15. The composition of claim 14, wherein the grinding of whole white or yellow mustard seeds in the presence of water and vinegar is done at a pH of 2-4.

16. The composition according to claim 14, wherein at least 25% by weight of the egg yolk has been modified by treatment with a phospholipase.

17. The composition according to claim 16, wherein the concentration of egg yolk which has been modified by treatment with phospholipase ranges from 0.5% to 4% by weight of the composition.

18. The composition according to claim 14, wherein the composition is free from polymeric or oligomeric water structurants.

19. The composition of claim 14, wherein the whole white or yellow mustard seeds have been heated whole to a temperature of at least 72° C.

* * * * *